United States Patent
Kobashi et al.

(10) Patent No.: US 7,610,414 B2
(45) Date of Patent: Oct. 27, 2009

(54) DATA TRANSFER METHOD AND SYSTEM, INPUT/OUTPUT REQUEST DEVICE, AND COMPUTER-READABLE RECORDING MEDIUM HAVING DATA TRANSFER PROGRAM RECORDED THEREON

(75) Inventors: Kyu Kobashi, Kawasaki (JP); Hideyuki Tanaka, Kawasaki (JP); Fumiaki Itou, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 46 days.

(21) Appl. No.: 10/990,455

(22) Filed: Nov. 18, 2004

(65) Prior Publication Data

US 2005/0283552 A1 Dec. 22, 2005

(30) Foreign Application Priority Data

Jun. 17, 2004 (JP) .............................. 2004-180127

(51) Int. Cl.
*G06F 5/00* (2006.01)

(52) U.S. Cl. ......................... 710/38; 710/316; 709/213; 709/240

(58) Field of Classification Search .................. 710/38, 710/316, 48, 52, 110, 113; 709/201, 203, 709/213, 240; 711/113, 114; 718/104, 105
See application file for complete search history.

(56) References Cited

U.S. PATENT DOCUMENTS

| | | | | |
|---|---|---|---|---|
| 3,639,909 A | * | 2/1972 | Hauck et al. .................. | 710/38 |
| 6,125,396 A | * | 9/2000 | Lowe .......................... | 709/234 |
| 6,145,028 A | * | 11/2000 | Shank et al. .................. | 710/31 |
| 6,385,678 B2 | * | 5/2002 | Jacobs et al. ................. | 710/113 |
| 6,434,637 B1 | * | 8/2002 | D'Errico ....................... | 710/38 |
| 6,564,294 B1 | * | 5/2003 | Fujibayashi et al. ........... | 711/114 |
| 6,826,240 B1 | * | 11/2004 | Thomas et al. ................ | 375/340 |
| 7,007,189 B2 | * | 2/2006 | Lee et al. ........................ | 714/4 |
| 7,085,875 B1 | * | 8/2006 | Yona et al. .................... | 710/307 |

FOREIGN PATENT DOCUMENTS

| | | |
|---|---|---|
| JP | 4-168560 | 6/1992 |
| JP | 5-282242 | 10/1993 |

(Continued)

OTHER PUBLICATIONS

Hewlett-Packard. HP Insight Dynamics - VSE. Defining Storage for Logical Servers. Mar. 2009.*

(Continued)

*Primary Examiner*—Mark Rinehart
*Assistant Examiner*—Matthew D Spittle
(74) *Attorney, Agent, or Firm*—Staas & Halsey LLP

(57) ABSTRACT

A data transfer method for transferring, through use of a plurality of paths, data between a plurality of logic devices provided in an external storage device and an input/output request device which issues input/output requests to the respective logic devices of the external storage device. The method includes a first step for setting priority levels of the plurality of logic devices; a second step for setting usage rates of the paths for the respective logic devices on the basis of the priority levels set in the first step; and a third step for transferring the data through use of respective paths such that the usage rates set in the second step are achieved.

11 Claims, 4 Drawing Sheets

FOREIGN PATENT DOCUMENTS

| | | |
|---|---|---|
| JP | 9-305320 | 11/1997 |
| JP | 2001-147886 | 5/2001 |
| JP | 2001-320439 | 11/2001 |
| JP | 2002-091902 | 3/2002 |

OTHER PUBLICATIONS

Michelogiannakis et al. Approaching Ideal NoC Latency with Pre-Configured Routes. Proceedings of the First International Symposium on Networks-on-Chip. IEEE. 2007.*

Chen et al. Cross-layer and Path Priority Scheduling based Real-time Video Communications over Wireless Sensor Networks. IEEE. 2008.*

Japanese Patent Office mailed Notice of Reasons for Rejection on Apr. 15, 2008 in related to Japanese application 2004-180127.

* cited by examiner

FIG. 3

| LOGIC DEVICE | PRIORITY |
| --- | --- |
| lun21a | HIGH |
| lun21b | MEDIUM |
| lun21c | LOW |

FIG. 4

| LOGIC DEVICE | PATH 1 | PATH 2 | PATH 3 | PATH 4 |
| --- | --- | --- | --- | --- |
| lun21a | 33% | 33% | 33% | 0% |
| lun21b | 10% | 10% | 10% | 70% |
| lun21c | 0% | 0% | 0% | 100% |

FIG. 5

| LOGIC DEVICE | PATH 1 | PATH 2 | PATH 3 | PATH 4 | TOTAL PROCESSING VOLUME |
| --- | --- | --- | --- | --- | --- |
| lun21a | 77 | 77 | 77 | 0 | 231 |
| lun21b | 23 | 23 | 23 | 41 | 110 |
| lun21c | 0 | 0 | 0 | 59 | 59 |
| PROCESSING CAPABILITY | 100 | 100 | 100 | 100 | 400 |

DATA TRANSFER METHOD AND SYSTEM, INPUT/OUTPUT REQUEST DEVICE, AND COMPUTER-READABLE RECORDING MEDIUM HAVING DATA TRANSFER PROGRAM RECORDED THEREON

BACKGROUND OF THE INVENTION

1) Field of the Invention

The present invention relates to a technique for transferring data between a plurality of logic devices provided in an external device, such as a disk drive unit, and an input/output request device (host) for making an input/output request to the plurality of logic devices, through use of a plurality of paths.

2) Description of the Related Art

FIG. 6 is a block diagram showing the configuration of a conventional data transfer system. As shown in FIG. 6, a conventional data transfer system 100 comprises a disk drive (external storage device) 105 having a plurality of logic devices (designated as "lun" in the drawings, where "lun" is an abbreviate of a logical number) 106a, 106b, and 106c; a host (input/output request device) 101 for making an input/output [hereinafter called an I/O (Input/Output)] request to the respective logic devices 106a to 106c of the disk drive unit 105; and a plurality of paths 108-1 to 108-4 which connect the host 101 to the disk drive 105 and which transfer data between the host 101 and the respective logic devices 106a to 106c of the disk drive 105.

The respective paths 108-1 to 108-4 are connected to host adapters (HBA: Host Bus Adapter) 104-1 to 104-4 of the host 101 as well as to channel adapters (CA: Channel Adapter) 107-1 to 107-4 of the disk drive 105 corresponding to the HBA 104-1 to 104-4, thereby connecting the host 101 to the disk drive 105.

The host 101 is provided with a computing section (e.g., a CPU: Central Processing Unit) 102, and further comprises a driver 103 which allocates, to the respective paths 108-1 to 108-4, I/O requests issued in accordance with an application program executed by the computing section 102.

At the time of allocating the I/O requests issued on the basis of the application executed by the computing section 102 of the host 101, such a conventional data transfer system 100 allocates the I/O requests such that the number of I/O requests in queues of the respective paths 108-1 to 108-4 or the quantity of data transferred becomes uniform among the paths 108-1 to 108-4, or allocates the I/O requests to the respective paths 108-1 to 108-4 on the basis of a preset load sharing.

However, if a change has arisen in the quantity of data flowing to the paths for reasons of a change in the operating state of the portion of the system ranging from the host 101 to the disk drive 105 or for reasons of transfer of data to a terminal other than the disk drive 105, processing capabilities of the respective paths 108-1 to 108-4 have become nonuniform. In the path whose processing capability has become deteriorated, access response to the I/O request is deteriorated, thereby causing a problem of a decrease in access speed.

There has already been proposed a technique for ascertaining loading conditions of the respective paths (i.e., the number of I/O requests or the quantity of data transferred) on the basis of the throughput of each path per unit time and varying proportions of the I/O requests distributed to the respective paths on the basis of the loading condition, thereby optimizing transfer efficiency (see Patent Document 1 provided below).

[Patent Document 1] Japanese Patent Application Laid-Open No. 2001-320439

However, according to the data transfer system 100 shown in FIG. 6 and the technique disclosed in Patent Document 1, the respective logic devices 106a to 106c of the disk drive 105 are handled in a unified manner, thereby controlling a balance between the loads of the respective logic devices 106a to 106c. For this reason, the data retained in the respective logic devices 106a to 106c are also handled in a unified manner.

Consequently, the conventional data transfer system suffers the following problem. When an access speed is important in system operation; that is, when data for which required access response speed must be ensured and data for which access response speed is not required are coresident in the plurality of logic devices, an I/O request to data for which an access speed must be prioritized (i.e., an I/O request to a logic device retaining data for which an access speed must be prioritized) is hindered by an I/O request to another data set for which the access speed is not prioritized. As a result, the access response performance of the logic device retaining the data for which the access speed must be prioritized is deteriorated.

SUMMARY OF THE INVENTION

The present invention has been conceived in view of such a problem and prevents a decrease in access response performance of a logic device in accordance with the speed of an access response required by the logic device when data are transferred to a plurality of logic devices provided in an external storage device through use of a plurality of paths by means of making I/O requests.

In order to achieve the object, a data transfer method of the present invention is a data transfer method for transferring, through use of a plurality of paths, data between a plurality of logic devices provided in an external storage device and an input/output request device which issues input/output requests to the respective logic devices of the external storage device, the method comprising: a first step for setting priority levels of the plurality of logic devices; a second step for setting usage rates of the paths for the respective logic devices on the basis of the priority levels set in the first step; and a third step for transferring the data through use of respective paths such that the usage rates set in the second step are achieved.

In the first step, the priority levels are preferably set in accordance with speeds required by access responses to the respective logic devices.

In the second step, the usage rates are preferably set such that total processing volumes of respective paths assigned to the logic device become larger as the priority level set for the logic device in the first step becomes higher.

To achieve the object, a data transfer system of the present invention is a data transfer system comprising: an external storage device equipped with a plurality of logic devices; an input/output request device for issuing an input/output request to the respective logic devices of the external storage devices; a plurality of paths which connects the external storage device to the input/output request device and which transfers data between the respective logic devices of the external storage device and the input/output request device; a priority level setting section for setting priority levels of the plurality of logic devices; a usage rate setting section for setting usage rates of the respective paths for the respective logic devices on the basis of the priority levels set by the priority level setting section; and a data transfer control section which performs the data transfer by using the respective paths such that the usage rate set by the usage rate setting section is achieved.

The input/output request device preferably has the priority level setting section, the usage rate setting section, and the data transfer control section.

Moreover, the priority level setting section preferably sets the priority levels in accordance with speeds required by access responses to the respective logic devices.

Furthermore, the usage rate setting section preferably sets the usage rates such that total processing volumes of respective paths assigned to the logic device become larger as the priority level for the logic device set by the priority level setting section becomes higher.

In addition, in order to achieve the object, an input/output request device of the present invention is an input/output request device for transferring, through use of a plurality of paths, data to a plurality of logic devices provided in an external storage device by means of issuing input/output requests to the plurality of logic devices of the external storage device, the device comprising: a priority level setting section for setting priority levels of the plurality of logic devices; a usage rate setting section for setting usage rates of the paths for the respective logic devices on the basis of the priority levels set by the priority level setting section; and a data transfer control section which performs the data transfer by using the respective paths such that the usage rate set by the usage rate setting section is achieved.

Moreover, in order to achieve the object, a computer-readable recording medium having recorded thereon a data transfer program is a computer-readable recording medium having recorded thereon a data transfer program for causing a computer to fulfill a function for transferring, through use of a plurality of paths, data to a plurality of logic devices provided in an external storage device by means of issuing input/output requests to the plurality of logic devices of the external storage device, wherein the data transfer program causes the computer to act as: a priority level setting section for setting priority levels of the plurality of logic devices; a usage rate setting section for setting usage rates of the paths for the respective logic devices on the basis of the priority levels set by the priority level setting section; and a data transfer control section which performs the data transfer by using the respective paths such that the usage rate set by the usage rate setting section is achieved.

As mentioned above, according to the present invention, usage proportions of respective paths are set for the respective logic devices on the basis of priorities of the plurality of logic devices. Data are transferred through use of the paths such that these usage proportions are attained. Hence, the paths can be assigned, in a prioritized manner, to the logic devices whose access response performances must be prevented from being deteriorated, in accordance with the access response speeds required by the logic devices.

Consequently, the logic devices retaining data whose access speed must be prioritized can be set so as to be handled in a prioritized manner. As a result, there can be reliably prevented occurrence of a failure to ensure an access speed of data whose access speed must be prioritized, which would otherwise arise when the I/O request is hindered by another I/O request to other data whose access speed is not to be prioritized.

Priorities are set in accordance with the access response speeds requested by the logic devices. Moreover, the usage proportions are set such that the higher the priority set for the logic device, the greater the total throughput of the path allocated to that logic path. As a result, a logic device with a higher priority among the plurality of logic devices can be more reliably prevented from being subjected to deterioration of access response performance.

BRIEF DESCRIPTION OF THE DRAWINGS

FIG. 3 is a view showing an example setting of priorities performed by a priority setting section of the data transfer system acting as the embodiment of the present invention;

FIG. 4 is a view showing an example setting of usage proportions made by a usage proportion setting section of the data transfer system acting as the embodiment of the present invention;

FIG. 5 is a view showing throughputs of respective paths for respective logic devices based on the usage proportions shown in FIG. 4.

DESCRIPTION OF THE PREFERRED EMBODIMENT

An embodiment of the present invention will be described hereinbelow by reference to the drawings.

[1] About an Embodiment of the Present Invention

Figure 1:
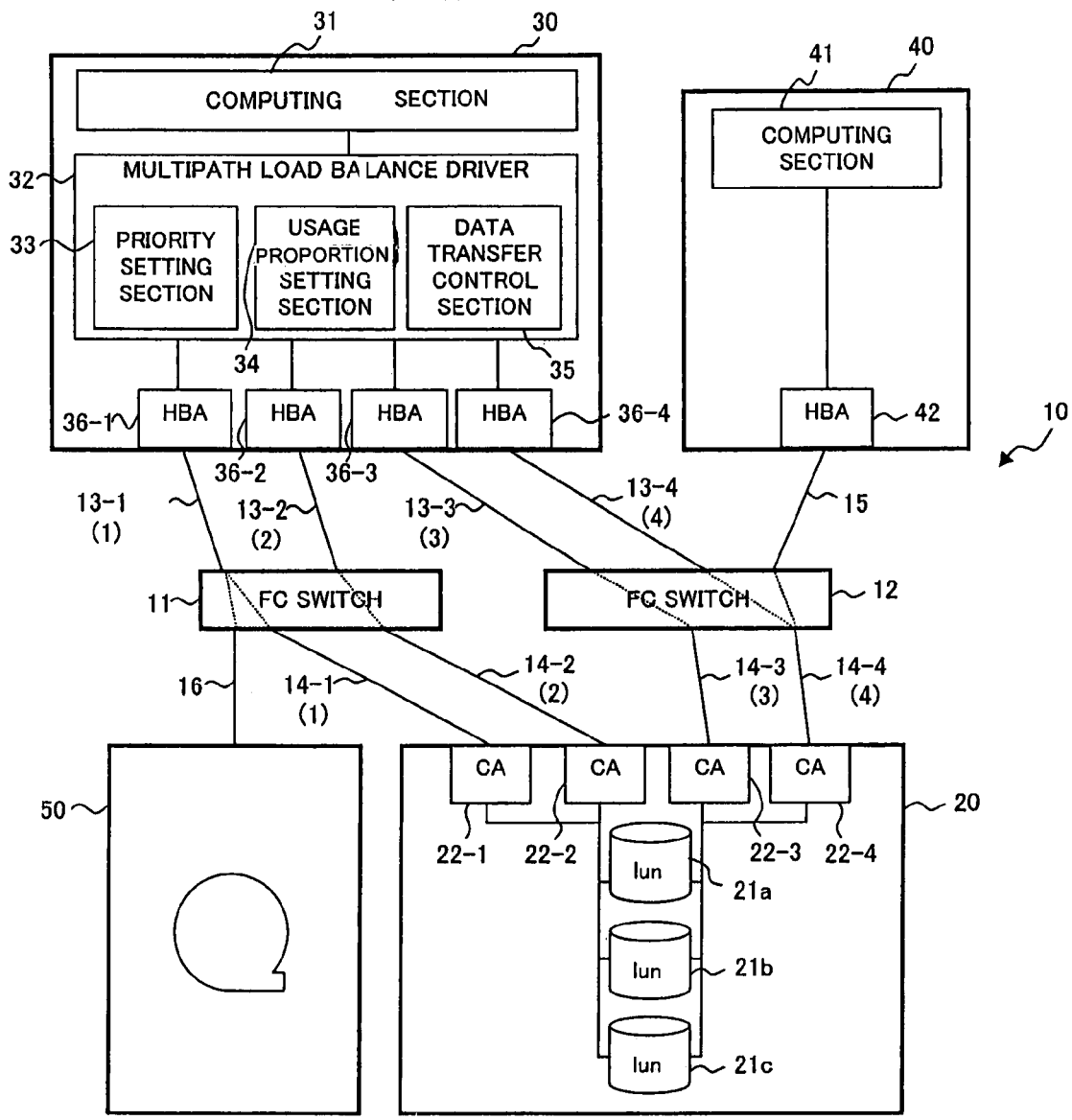
FIG. 1 is a block diagram showing the configuration of a data transfer system acting as an embodiment of the present invention.

First, the configuration of a data transfer system acting as the embodiment of the present invention will be described. FIG. 1 is a block diagram showing the configuration of a data transfer system 10 of the embodiment. As shown in FIG. 1, the data transfer system 10 of the embodiment comprises FC (Fiber Channel) switches 11, 12; paths 13-1 to 13-4, 14-1 to 14-4, 15, and 16; a disk drive (an external storage device) 20; a host (an input/output request device) 30; a host 40; and a tape device 50.

Single ends of the respective paths 13-1, 13-2, 14-1, 14-2, and 16 are connected to the FC switch 11. The other end of the path 13-1 is connected to a host bus adapter (HBA) 36-1 of the host 30 to be described later, and the other end of the path 13-2 is connected to an HBA 36-2 to be described later. The other end of the path 14-1 is connected to a channel adapter (CA) 22-1 of the disk drive 20 to be described later, the other end of the path 14-2 is connected to a CA 22-2 to be described later, and the other end of the path 16 is connected to the tape device 50.

As shown in FIG. 1 (see dotted lines provided in the FC switch 11), the paths 14-1 and 16 are connected to the path 13-1 by means of the FC switch 11, and the path 13-2 is connected to the path 14-2. Consequently, the host 30 and the disk drive 20 are connected so as to enable transfer of data by means of a path (hereinafter called a path 1) consisting of the paths 13-1 and 14-1 and another path (hereinafter called a path 2) consisting of the paths 13-2 and 14-2.

By means of the FC switch 11 having switched the connection of the path 13-1 to the path 16, the host 30 and the tape device 50 are connected so as to enable transfer of data by means of the path consisting of the paths 13-1 and 16.

Single ends of respective paths 13-3, 13-4, 14-3, 14-4, and 15 are connected to the FC switch 12. The other end of the path 13-3 is connected to an HBA 36-3 of the host 30 to be described later, and the other end of the path 13-4 is connected to an HBA 36-4 to be described later. The other end of the path 14-3 is connected to a CA 22-3 of the disk drive 20 to be described later, the other end of the path 14-4 is connected to a CA 22-4 to be described later, and the other end of the path 15 is connected to an HBA 42 of the host 40.

As shown in FIG. 1 (see the dotted lines provided in the FC switch 12), by means of the FC switch 12, the paths 13-3 and 14-3 are connected together, and the paths 13-4 and 15 are connected to the path 14-4. Consequently, the host 30 and the disk drive 20 are connected so as to enable transfer of data by means of a path (hereinafter called a path 3) consisting of the paths 13-3 and 14-3 and another path (hereinafter called a path 4) consisting of the paths 13-4 and 14-4.

By means of the FC switch 12 having switched the connection of the path 14-4 to the path 15, the host 40 and the disk device 20 are connected so as to enable transfer of data by means of the path consisting of the paths 14-4 and 15.

Each of the paths 13-1 to 13-4, 14-1 to 14-4, 15, and 16 is formed from, e.g., an optical fiber and a coaxial cable. In the embodiment, data transfer capabilities (processing capabilities) of the respective paths are presumed to be uniform.

The disk drive 20 is a storage device for storing data; is formed from a plurality of logic devices (designated as "lun" in the drawings, where "lun" is an abbreviate of a logical unit number) 21a, 21b, and 21c; and comprises the CA 22-1 to 22-4.

The host 30 comprises a computing section 31 formed from, e.g., a CPU (Central Processing Unit); a multipath load balance driver 32; and the HBAs 36-1 to 36-4.

The computing section 31 is for running an application program (hereinafter called simply an "application") stored in, e.g., a storage section (not shown) of the host 30.

The multipath load balance driver 32 is for issuing the I/O requests made by the application executed by the computing section 31 to the plurality of logic devices 21a to 21c of the disk drive 20. The multipath load balance driver 32 comprises a priority setting section 33, a usage proportion setting section 34, and a data transfer control section 35.

The priority setting section 33 is for setting priorities of the respective logic devices 21a to 21c in accordance with access response speeds required by the respective logic devices 21a to 21c, as will be described later by reference to FIG. 3.

The usage proportion setting section 34 is for setting usage proportions (load dispersion proportions) of the respective paths 1 to 4 for the plurality of respective logic devices 21a to 21c on the basis of the priorities set by the priority setting section 33. As will be described later by reference to, e.g., FIGS. 4 and 5, the usage proportions are set such that the higher the priority set by the priority setting section 33, the greater the total throughput of the path allocated to that logic path.

The data transfer control section 35 allocates the I/O requests made on the basis of the application executed by the computing section 31 to the respective paths 1 to 4 by way of the HBAs 36-1 to 36-4 such that the usage proportions set by the usage proportion setting section 34 are achieved. Specifically, data are transferred between the host 30 and the disk drive 20 through use of the respective paths 1 to 4 such that the usage proportions set by the usage proportion setting section 34 are achieved.

The host 40 has a computing section 41 having a function analogous to or substantially analogous to that of the computing section 31 of the host 30, and the HBA 42. The host 40 can transfer data to the disk drive 20 by use of the path 15 and the path 14-4.

The tape device 50 is a storage device equipped with, e.g., a magnetic tape. The host 30 can transfer data to the tape device 50, as well, through use of the paths 13-1 and 16.

Figure 2:
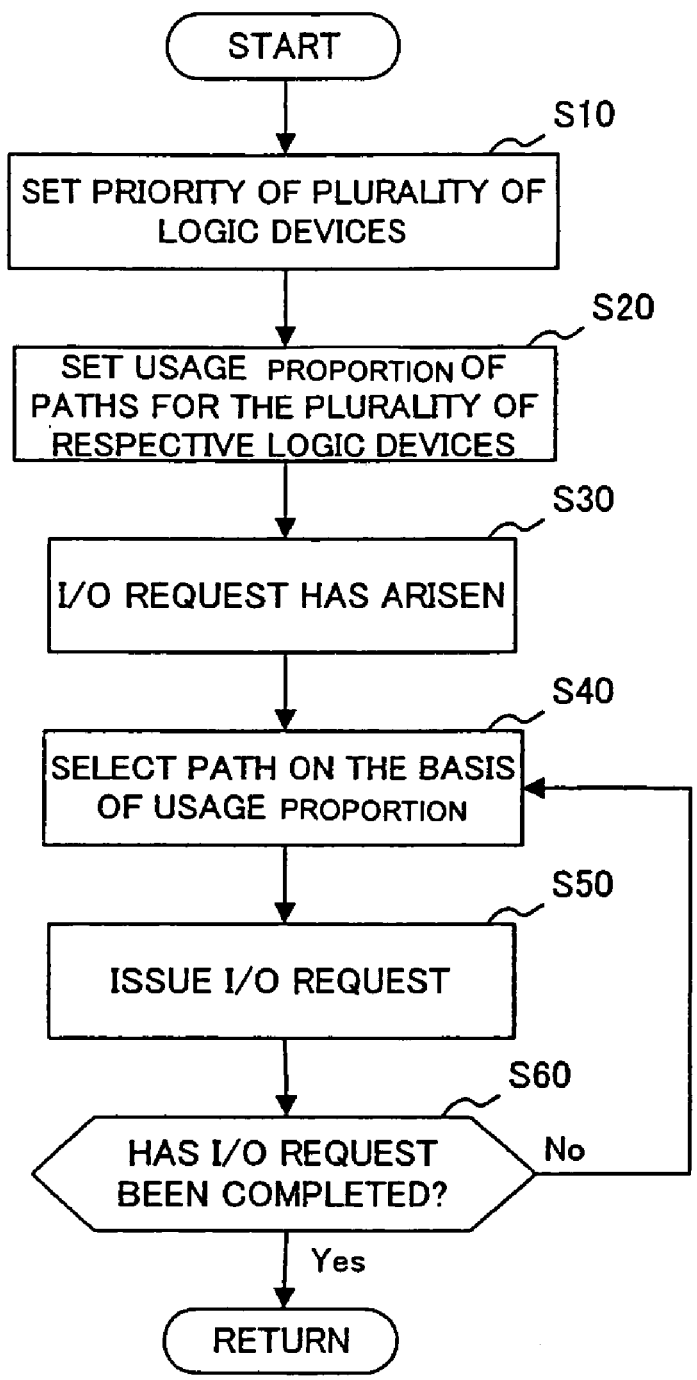
FIG. 2 is a flowchart for describing procedures of a data transfer method acting as an embodiment of the present invention.
Figure 6:
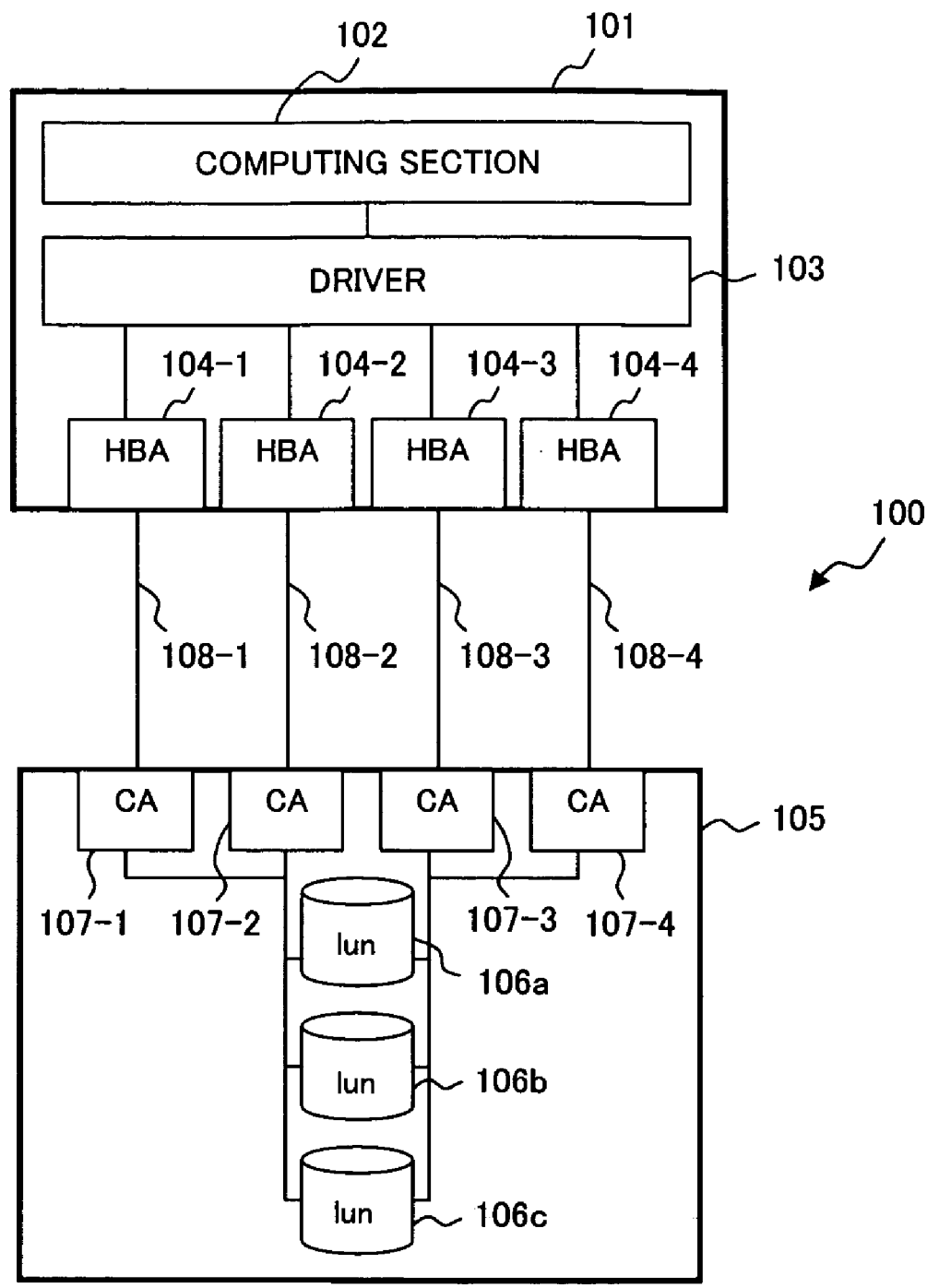
FIG. 6 is a block diagram showing the configuration of a conventional data transfer system.

There will now be described a data transfer method (operation of the data transfer system 10 constituted as shown in FIG. 1) of the present embodiment. FIG. 2 is a flowchart for describing procedures of the data transfer method of the present embodiment (steps S10 to S60). As shown in FIG. 2, according to the data transfer method of the embodiment, the priority setting section 33 sets priorities such that the priorities become higher as required access response speeds become faster, in accordance with the access response speeds required by the respective logic devices 21a to 21c of the disk drive 20 (step S10: a first step). Specifically, when data to be retained in the respective logic devices 21a to 21c or the retained data are data for which an access speed must be prioritized, the priority setting section 33 sets high priorities of the logic devices retaining the data such that the faster the access speed required for the data, the higher the priority assigned to that data.

FIG. 3 shows example setting of the priorities made by the priority setting section 33 in step S10. As shown in FIG. 3, in the embodiment, the disk drive 20 has three logic devices (i.e., the logic devices 21a to 21c). Hence, as mentioned previously, the priorities of the respective logic devices 21a to 21c are set stepwise as "high," "medium," and "low" in accordance with the access response speeds required by the respective logic devices. Here, the logic device 21a is set to "high"; the logic device 21b is set to "medium"; and the logic device 21c is set to "low."

As shown in FIG. 2, after processing pertaining to step S10 has been performed, the usage proportion setting section 34 sets the usage proportions of the respective paths 1 to 4 for the respective logic devices 21a to 21c on the basis of the priorities of the respective logic devices 21a to 21c set by the priority setting section 33 in step S10 (step S20: a second step). Here, the usage proportion setting section 34 sets the usage proportions such that the higher the priority of the logic device set by the priority setting section 33, the greater the total throughput of the path assigned to that logic device.

FIG. 4 shows an example setting of the usage proportions made by the usage proportion setting section 34 in step S20. As shown in FIG. 4, the usage proportion setting section 34 sets usage proportions of the paths to be used when the I/O requests are issued to the respective logic devices, for the respective logic devices 21a to 21c. Here, the logic device 21a sets all of the usage proportions of the paths 1 to 3 to 33% and uniformly distributes the I/O request to the logic device 21a among the paths 1 to 3. The logic device 21b sets the usage proportions of all the paths 1 to 3 to 10% and the usage proportion of the path 4 to 70%. The logic device 21c sets the usage proportions of all the paths 1 to 3 to 0%, and sets the usage proportion of the path 4 to 100%. Only the path 4 is used for the I/O request to the logic device 21c.

The data transfer capabilities (processing capabilities) of the paths 1 to 4 of the embodiment are all uniform, as mentioned previously. On the assumption that the per-unit-time throughputs of the paths 1 to 4, serving as data transfer capabilities thereof, are taken as 100, the throughputs assigned by the paths 1 to 4 to the respective logic devices 21a to 21c are distributed as shown in FIG. 5 according to the usage proportions set by the usage proportion setting section 34 in step S20 shown in FIG. 4.

As shown in FIG. 5, the paths 1 to 3 use (allocate) a throughput of 77 to the logic device 21a out of a total throughput of 100 and use a throughput of 23 to the logic device 21b. The paths 1 to 3 are not used for the logic device 21c.

Of a total throughput of 100, the path 4 uses a throughput of 41 to the logic device 21b and uses a throughput of 59 to the logic device 21c. The path 4 is not used for the logic device 21a.

Consequently, the total throughput of the path assigned to the logic device 21a assumes a value of 231; the total throughput of the path assigned to the logic device 21b assumes a value of 110; and the total throughput of the path assigned to the logic device 21c assumes a value of 59.

As mentioned above, in step S20 (see FIG. 2), the usage proportion setting section 34 sets the usage proportions such that the higher the priority of a logic device, the greater the total throughput of the path assigned to the logic device, on the basis of the priority set by the priority setting section 33.

As shown in FIG. 2, when the computing section 31 of the host 30 executes an application after having performed processing pertaining to step S20, whereby when the I/O requests are made to the logic devices 21a to 21c (step S30), the data transfer control section 30 selects the paths used for issuing the I/O requests to the respective logic devices 21a to 21c from the paths 1 to 4 (step S40), on the basis of the usage proportions set by the usage proportion setting section 34 in step S20, thereby issuing the I/O requests through use of the selected paths (step S50).

Subsequently, the data transfer control section 35 repeats processing pertaining to steps S40, S50 (a third step) until the I/O requests issued on the basis of the application are completed (a route designated by selection of NO in step S60). When the I/O requests issued on the basis of the application have been completed (a route designated by selection of YES in step S60), processing is completed.

As mentioned above, according to the data transfer system and method serving as the embodiment of the present invention, the priority setting section 30 sets, in step S10, priorities of the respective logic devices 21a to 21c in accordance with the access response speeds required by the logic devices 21a to 21c. In step S20, the usage proportion setting section 34 sets the usage proportions such that the higher the priority of a logic device, the greater the total throughputs of the paths 1 to 4 assigned to the logic device. In steps S40, S50, the data transfer control section 35 allocates the I/O requests issued on the basis of the application executed by the computing section 31 to the respective paths 1 to 4 such that the usage proportions are achieved. Hence, the usage proportions of the respective paths can be changed in accordance with the access response speeds required by the respective logic devices 21a to 21c of the disk drive 20; that is, the priorities of the speeds at which access is made to the data retained in the logic devices 21a to 21c. As a result, the logic devices to be handled in a prioritized manner can be set. Therefore, a logic device whose priority is set high by the priority setting section 33 can be prevented from being subjected to deterioration of response performance for accessing the logic device, which would otherwise be caused as a result of the I/O request having been hindered by an I/O request to another logic device or the like.

Specifically, priorities are set for the respective logic devices, thereby tilting the usage proportions of the respective paths (i.e., the distribution proportions of the I/O requests), whereby access responses of the logic devices can be designated priorities in accordance with the types of data retained in the logic devices (priorities of access speeds or the like).

The usage proportion setting section 34 sets only one path 4 to the logic device 21c with the lowest priority. The reason for this is that the logic device 21 with the lowest access response among the access responses required by the plurality of logic devices 21a to 21c would be susceptible to a small problem as compared with the other logic devices 21a, 21b even when the I/O request to the logic device 21c has been hindered by an access of the host 40 to the disk drive 20, thereby deteriorating the processing capability of the path 4. By means of assigning only one path 4 to such a logic device 21c, the remaining paths 1 to 3 can be assigned to the logic devices 21a, 21b with higher priorities. Consequently, the performance for responding to the accesses to the logic devices 21a, 21b can be prevented from being deteriorated significantly.

[2] Others

The present invention is not limited to the previously-described embodiments and can be carried out while being modified in a various manner within the scope of the present invention.

For instance, in the previously-described embodiment, the plurality of logic devices provided in the disk drive 20 correspond to the three logic devices 21a to 21c. Further, the plurality of paths for connecting the disk drive 20 to the host 30 correspond to four paths 1 to 4. However, the present invention is not limited to these logic devices or this number of paths.

In the previously-described embodiments, the data transfer capabilities (processing capabilities) of the respective paths 1 to 4 are not limited to those mentioned previously. The data transfer capabilities of the respective paths may be different. Even in such a case, the usage proportion setting section 34 sets usage proportions such that the logic devices with higher priorities set by the priority setting section 33 have larger total throughputs of the respective paths assigned to the logic device.

In the previously-described embodiment, the priority setting section 33, the usage proportion setting section 34, and the data transfer control section 35 are provided in the driver 32 of the host (input/output request device) 30. However, the present invention is not limited to such a configuration. The priority setting section 33, the usage proportion setting section 34, and the data transfer control section 35 may be provided in another, different device.

The function of the priority setting section 33, that of the usage proportion setting section 34, and that of the data transfer control section 35 can be fulfilled as a result of the computer (including a CPU, a data processor, or various terminals) executing a predetermined application program (a data transfer program).

The program is supplied while being recorded in a computer-readable recording medium; for instance, a flexible disk, a CD-ROM, a CD-R, a CD-RW, a DVD, or the like. In this case, the computer loads a data transfer program from the recording medium, transfers the thus-loaded program to an internal or external storage device, and stores the program in the storage device. The program may be left recorded in a storage device (a recording medium); e.g., a magnetic disk, an optical disk, a magneto-optical disk or the like, and may be provided to the computer from the storage device by way of a communications line.

Here, the computer is a concept encompassing hardware and an OS (operating system) and signifies hardware which operates under control of the OS. When hardware is operated through use of only an application program without a necessity for the OS, the hardware itself corresponds to a computer. The hardware has at least a microprocessor such as a CPU, and a section for reading a computer program recorded on the recording medium. The application program serving as the data transfer program includes program codes for causing the previously-described computer to function as the priority setting section 33, the usage proportion setting section 34, and the data transfer control section 35. Portions of the functions may be fulfilled by the OS rather than by the application program.

In addition to the previously-described flexible disk, the CD-ROM, the CD-R, the CD-RW, the DVD, the magnetic disk, the optical disk, and the electro-optical disk, the recording medium of the present embodiment can utilize an IC card, a ROM cartridge, a magnetic tape, a punch card, an internal storage device (memory such as RAM or ROM) of the computer, an external storage device, a print having codes such as bar codes printed thereon, or various computer-readable mediums.

What is claimed is:

1. A data transfer method for transferring, through use of a plurality of paths, data between a plurality of logic devices provided in an external storage device and an input/output request device which issues input/output requests to each of said plurality of logic devices of said external storage device, the method comprising:

setting priority levels of said plurality of logic devices;
setting a distribution proportion at which the input/output requests to each said logic device are distributed to said plurality of paths on the basis of said priority levels such that each of said plurality of logic devices other than one of said plurality of logic devices with a lowest priority defined in terms of said priority levels uses two or more of said plurality of paths, and such that the logic device with the lowest priority uses only one of said plurality of paths which is different from two or more paths used by one of said plurality of logic devices with highest priority defined in terms of said priority levels to transfer the request to the logic device with the lowest priority; and
transferring said data through use of respective paths according to the distribution proportions,
wherein the distribution proportions are set such that total processing volumes of respective paths assigned to a logic device becomes larger as a priority level for the logic device becomes higher.

2. The data transfer method according to claim 1, wherein said priority levels are set, in accordance with speeds required by access responses to said respective logic devices.

3. The data transfer method according to claim 1, wherein:
the distribution proportions of two or more paths used by the logic device with the highest priority are set to be same; and
the distribution proportions of two or more paths used by remaining logic devices other than the logic device with the highest priority are set to be higher than the distribution proportions of the two or more path used by the logic device with the highest priority.

4. A data transfer system comprising:
an external storage device equipped with a plurality of logic devices;
an input/output request device for issuing an input/output request to each of said logic devices of said external storage devices;
a plurality of paths which connects said external storage device to said input/output request device and which transfers data between said respective logic devices of said external storage device and said input/output request device;
a priority level setting section for setting priority levels of said plurality of logic devices;
a usage rate setting section for setting a distribution proportion at which the input/output requests to each said logic device are distributed to said plurality of paths on the basis of said priority levels such that each of said plurality of logic devices other than one of said plurality of logic devices with a lowest priority defined in terms of said priority levels uses two or more of said plurality of paths, and such that the logic device with the lowest priority uses only one of said plurality of paths which is different from two or more paths used by one of said plurality of logic devices with highest priority defined in terms of said priority levels to transfer the request to the logic device with the lowest priority; and
a data transfer control section which performs said data transfer by using said respective paths according to the distribution proportions,
wherein the distribution proportions are set such that total processing volumes of respective paths assigned to a logic device becomes larger as a priority level for the logic device becomes higher.

5. The data transfer system according to claim 4, wherein said input/output request device has said priority level setting section, said usage rate setting section, and said data transfer control section.

6. The data transfer system according to claim 4, wherein said priority level setting section sets said priority levels in accordance with speeds required by access responses to said respective logic devices.

7. An input/output request device for transferring, through use of a plurality of paths, data to a plurality of logic devices provided in an external storage device by means of issuing input/output requests to each of said plurality of logic devices of said external storage device, the device comprising:
a priority level setting section for setting priority levels of said plurality of logic devices;
a usage rate setting section for setting a distribution proportion at which the input/output requests to each said logic device are distributed to said plurality of paths on the basis of said priority levels such that each of said plurality of logic devices other than one of said plurality of logic devices with a lowest priority defined in terms of said priority levels uses two or more of said plurality of paths, and such that the logic device with the lowest priority uses only one of said plurality of paths which is different from two or more paths used by one of said plurality of logic devices with highest priority defined in terms of said priority levels to transfer the request to the logic device with the lowest priority; and
a data transfer control section which performs said data transfer by using said respective paths according to the distribution proportions,
wherein the distribution proportions are set such that total processing volumes of respective paths assigned to a logic device becomes larger as a priority level for the logic device becomes higher.

8. The input/output request device according to claim 7, wherein said priority level setting section sets said priority levels in accordance with speeds required by access responses to said respective logic devices.

9. A computer-readable recording medium having recorded thereon a data transfer program for causing a computer to fulfill a function for transferring, through use of a plurality of paths, data to a plurality of logic devices provided in an external storage device by means of issuing input/output requests to each of said plurality of logic devices of said external storage device, wherein
said data transfer program causes said computer to act as:
a priority level setting section for setting priority levels of said plurality of logic devices;
a usage rate setting section for setting a distribution proportion at which the input/output requests to each said logic device are distributed to said plurality of paths on the basis of said priority levels such that each of said plurality of logic devices other than one of said plurality of logic devices with a lowest priority defined in terms of said priority levels uses two or more of said plurality of paths, and such that the logic device with the lowest priority uses only one of said plurality of paths which is different from two or more paths used by one of said plurality of logic devices with highest priority defined in terms of said priority levels to transfer the request to the logic device with the lowest priority; and a data transfer control section which performs said data transfer by using said respective paths according to the distribution proportions, wherein the distribution proportions are set such that total processing volumes of respective paths assigned to a logic device becomes larger as a priority level for the logic device becomes higher.

10. The computer-readable recording medium having a data transfer program recorded thereon according to claim 9, wherein said priority levels are set in accordance with speeds required by access responses to said respective logic devices, when said computer is caused to act as said priority setting section.

11. The computer-readable recording medium having a data transfer program recorded thereon according to claim 9, wherein said usage rates set by said usage rate setting section are rates at which input/output requests to said respective logic devices issued by said input/output request device are distributed to said respective paths.

* * * * *